United States Patent
Tezuka

(10) Patent No.: US 10,387,759 B2
(45) Date of Patent: Aug. 20, 2019

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Taiki Tezuka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/235,354

(22) Filed: Aug. 12, 2016

(65) Prior Publication Data
US 2017/0061265 A1   Mar. 2, 2017

(30) Foreign Application Priority Data

Aug. 24, 2015 (JP) .................................. 2015-165153

(51) Int. Cl.
| | | |
|---|---|---|
| *H04N 1/405* | (2006.01) | |
| *G06K 15/00* | (2006.01) | |
| *G06K 15/14* | (2006.01) | |
| *G06K 15/02* | (2006.01) | |
| *G06K 15/12* | (2006.01) | |

(52) U.S. Cl.
CPC ......... *G06K 15/407* (2013.01); *G06K 15/129* (2013.01); *G06K 15/14* (2013.01); *G06K 15/1876* (2013.01); *G06K 15/1894* (2013.01)

(58) Field of Classification Search
None
See application file for complete search history.

(56) References Cited

U.S. PATENT DOCUMENTS

| 2002/0114012 A1* | 8/2002 | Fujita | ......................... B41J 2/52 |
| | | | 358/3.06 |
| 2012/0127488 A1* | 5/2012 | Nakatsuji | ........... G03G 15/5025 |
| | | | 358/1.1 |
| 2012/0188276 A1* | 7/2012 | Yamaguchi | .......... H04N 1/4058 |
| | | | 345/629 |
| 2013/0208322 A1* | 8/2013 | Shimahashi | ....... G06K 15/1877 |
| | | | 358/3.13 |

FOREIGN PATENT DOCUMENTS

| JP | H10-336429 A | | 12/1998 |
| JP | 2002223357 A | * | 8/2002 |
| JP | 2007-124086 A | | 5/2007 |

* cited by examiner

*Primary Examiner* — Huo Long Chen
(74) *Attorney, Agent, or Firm* — Venable LLP

(57) ABSTRACT

An image processing apparatus decides first growth points indicating positions at which dots for generating a screen having a low ruling are generated based on a predetermined screen ruling and screen angle, and second growth points that indicate positions at which dots for increasing the screen ruling of a screen represented by the first growth points are generated. The apparatus generates a screen for growing, in accordance with increase in pixel values of an input image, dots generated centered on the first growth points, and switching, when the pixel values exceed a threshold value, growth points from the first growth points to the second growth points, and growing, in accordance with increase in the pixel values, dots generated centered on the second growth points, and uses the generated screen for screen processing on image data to be printed.

12 Claims, 14 Drawing Sheets

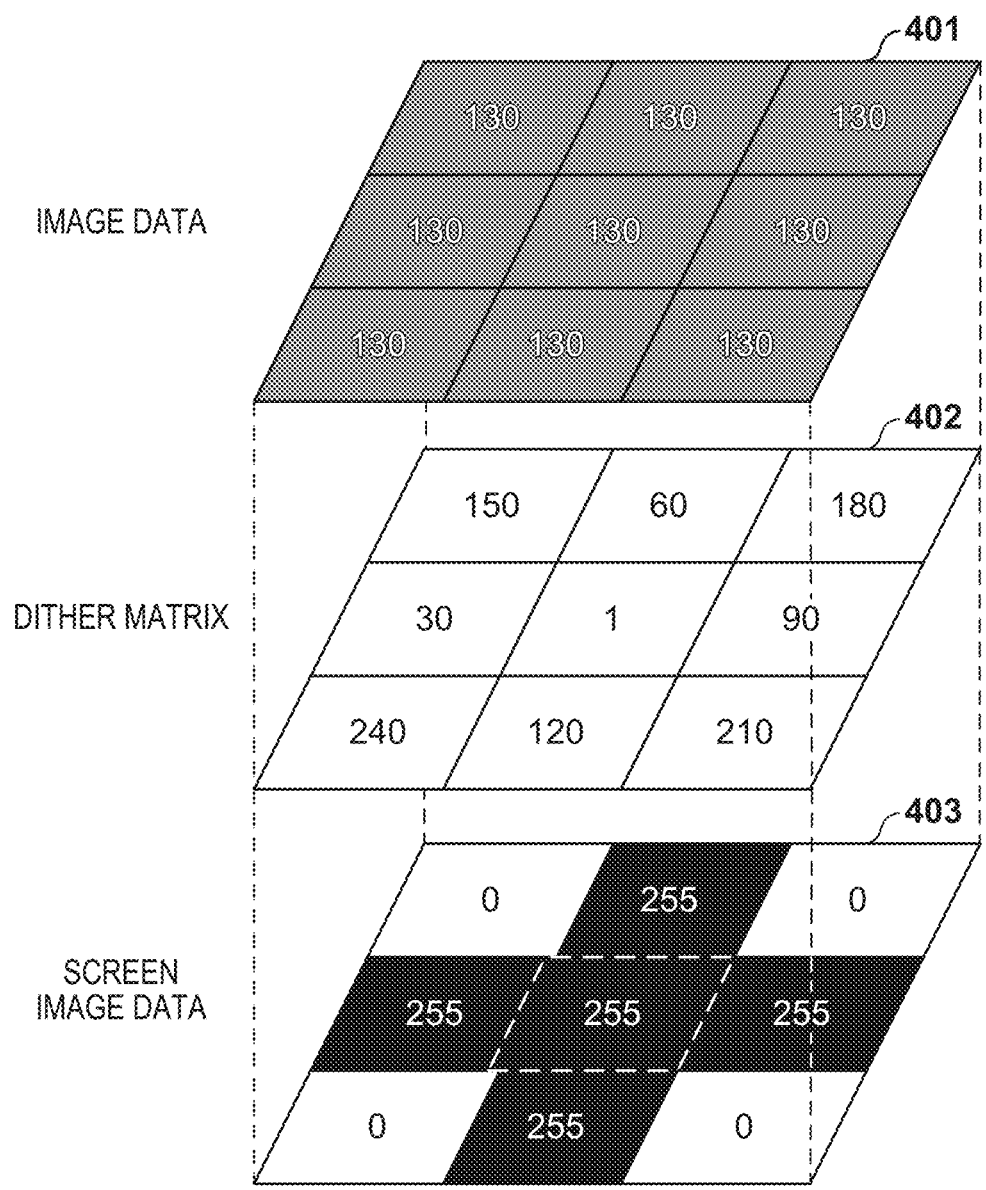

SCREEN IMAGE    FREQUENCY CHARACTERISTICS

134 LINES AND 72 DEGREES
190 LINES AND 27 DEGREES

SCREEN IMAGE    FREQUENCY CHARACTERISTICS

134 LINES AND 72 DEGREES
190 LINES AND 27 DEGREES 801  802

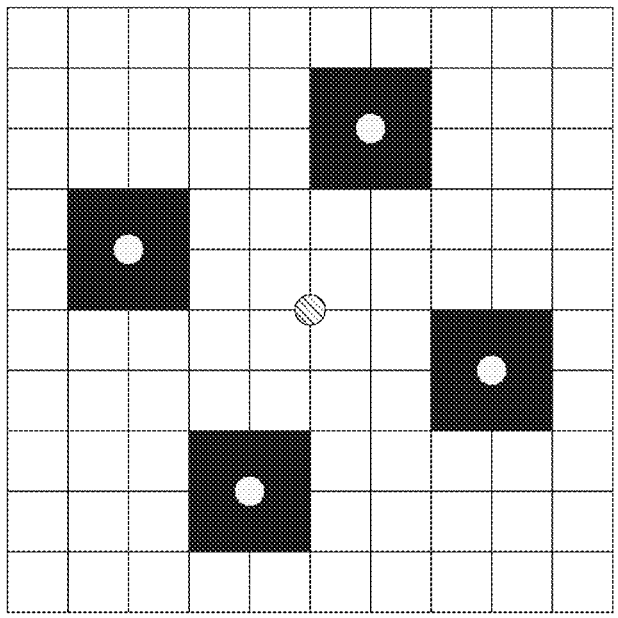
FIG. 9A
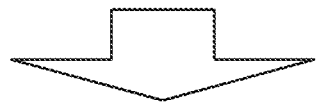
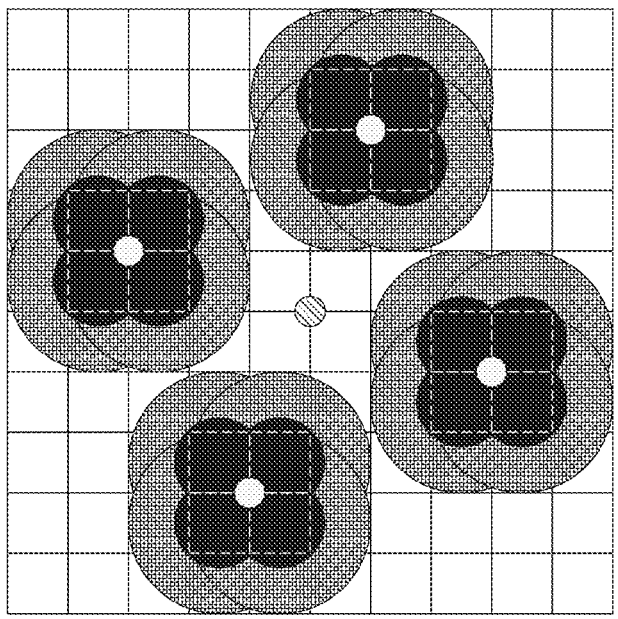
FIG. 9B

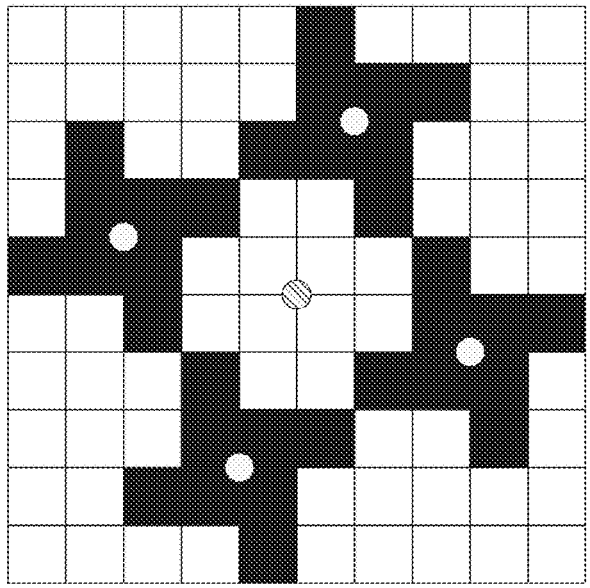
FIG. 10A
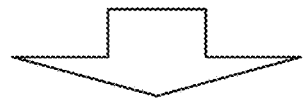
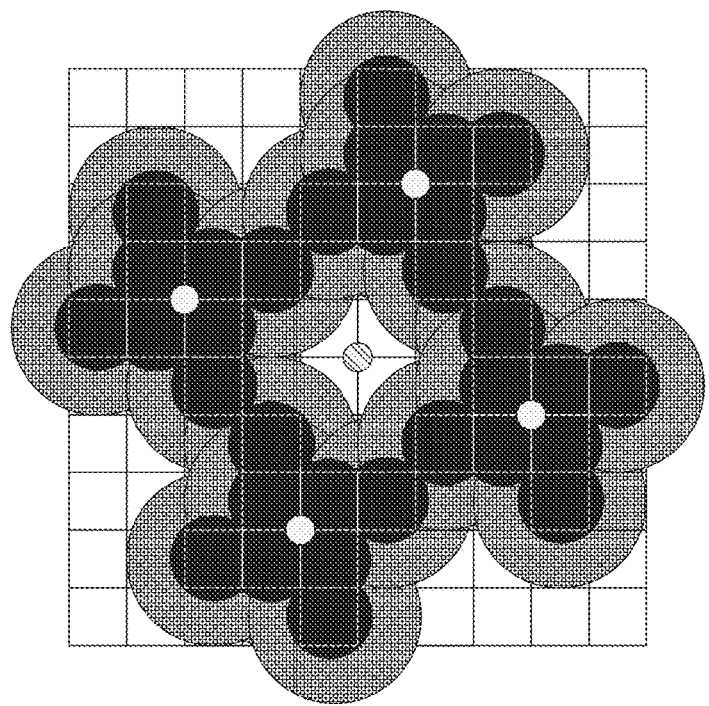
FIG. 10B

FIG. 11A
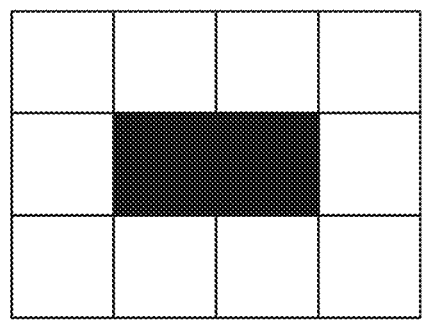
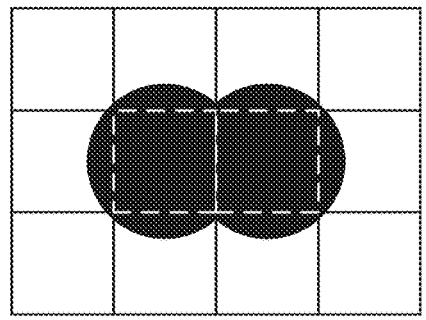
FIG. 11B
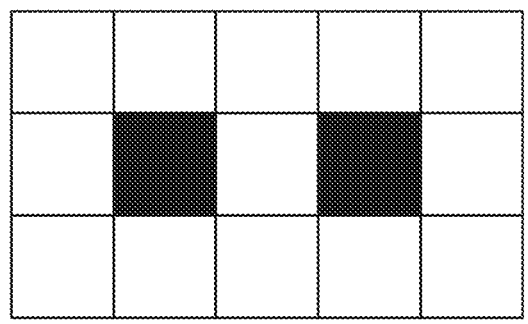
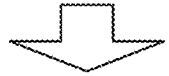
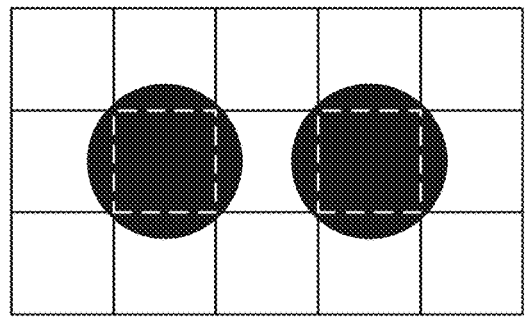

FIG. 14A

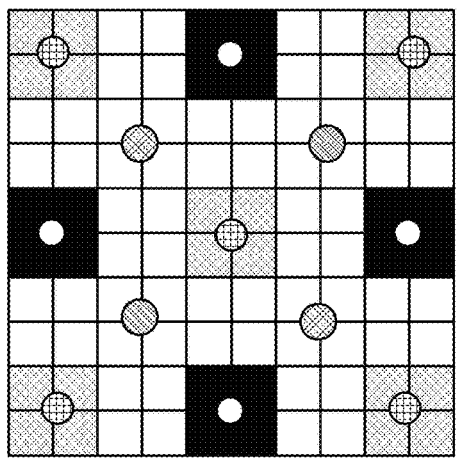

○ FIRST GROWTH POINT
⊕ SECOND GROWTH POINT
◉ THIRD GROWTH POINT
◎ FOURTH GROWTH POINT
▨ CANDIDATE PIXEL
   TO GROW NEXT

FIG. 14B

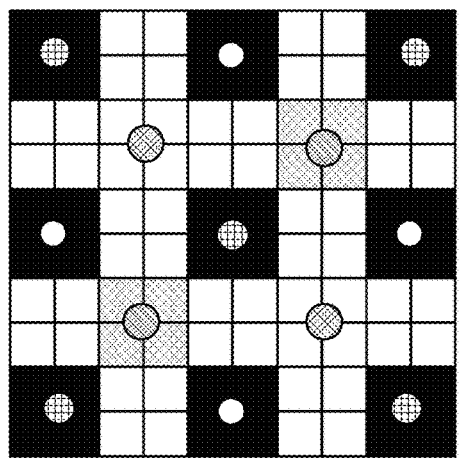

○ FIRST GROWTH POINT
⊕ SECOND GROWTH POINT
◉ THIRD GROWTH POINT
◎ FOURTH GROWTH POINT
▨ CANDIDATE PIXEL
   TO GROW NEXT

FIG. 14C

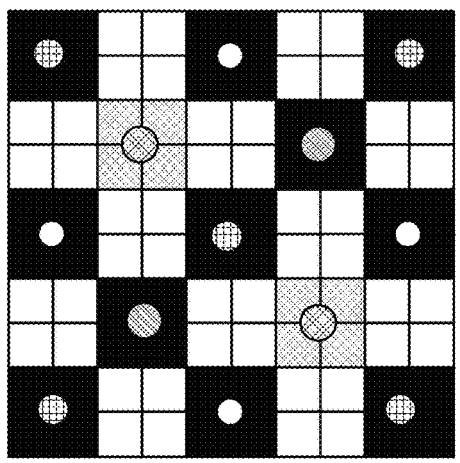

○ FIRST GROWTH POINT
⊕ SECOND GROWTH POINT
◉ THIRD GROWTH POINT
◎ FOURTH GROWTH POINT
▨ CANDIDATE PIXEL
   TO GROW NEXT

FIG. 14D

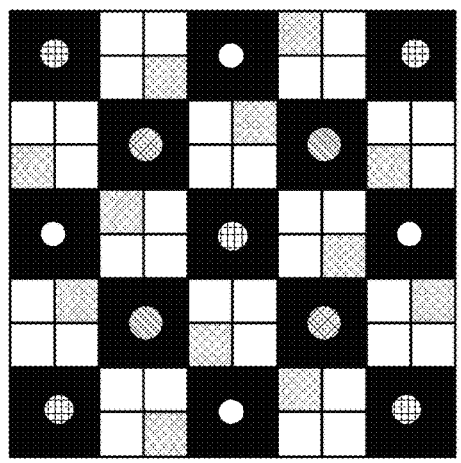

○ FIRST GROWTH POINT
⊕ SECOND GROWTH POINT
◉ THIRD GROWTH POINT
◎ FOURTH GROWTH POINT
▨ CANDIDATE PIXEL
   TO GROW NEXT

IMAGE PROCESSING APPARATUS, IMAGE PROCESSING METHOD AND STORAGE MEDIUM

BACKGROUND OF THE INVENTION

Field of the Invention

The present invention relates to an image processing apparatus, an image processing method and a storage medium.

Description of the Related Art

When printing a document including characters, graphics, photographs, images and the like, commonly, image formation using a screen having a low ruling is performed in photograph areas, and image formation using a screen having a high ruling is performed in character areas. When using a screen having a low ruling, the dots that are formed are very stable, and thus image formation with stable gradation is possible together with image formation with suppressed granularity (roughness). Therefore, it is preferred to use a screen having a low ruling for image formation in photograph areas. On the other hand, in the case of using a screen having a high ruling, the dots that are formed are fine, and thus detailed representation is possible. Therefore, it is preferred to use a screen having a high ruling for image formation in thin line areas and character areas.

Japanese Patent Laid-Open No. 2007-124086 discloses a technique for executing screen processing on each object, such as characters and photographs, using a screen selected from a plurality of screens whose screen angles are the same and whose screen rulings have an integer multiple relationship with each other. In Japanese Patent Laid-Open No. 2007-124086, even in the case where the screen ruling is switched for each object, favorable compression processing can be performed after screen processing.

It has become clear that, when comparing image formation using a screen having a low ruling and image formation using a screen having a high ruling, the consumption amount of a developing material (toner) during image formation is smaller when using a screen having a high ruling. This is because dots formed by a screen having a high ruling have a higher optical dot gain than dots formed by a screen having a low ruling, and even when the same amount of toner is used, can represent a higher density than a screen having a low ruling.

Therefore, in order to reduce running costs, it is desirable to apply a screen having a high ruling to not only character areas but also photograph areas. However, in the case of applying a screen having a high ruling to a low density portion (highlight portion) of an image, the dots that are formed are small and have low stability, and thus the gradation of the formed image deteriorates. Accordingly, it was difficult to realize gradation that has the same degree of stability as in the case of applying a screen having a low ruling while reducing the toner consumption amount by applying a screen having a high ruling.

SUMMARY OF THE INVENTION

The present invention has been made in light of the above-described problem. The present invention provides a technique that maintains stable gradation by applying a screen having a low ruling to a low density portion (highlight portion) of an image, while enabling a reduction in toner consumption amount by applying a screen having an increased ruling to a high density portion of the image.

According to one aspect of the present invention, there is provided an image processing apparatus for performing screen processing on image data to be printed, the image processing apparatus comprising: a decision unit configured to decide growth points for growing a screen used for the screen processing, based on a predetermined screen ruling and screen angle, the growth points being a first growth point that indicates a position at which a dot for generating a screen having a low ruling is generated, and a second growth point that is different from the first growth point and indicates a position at which a dot for increasing a screen ruling of a screen represented by the first growth point is generated; a generation unit configured to generate a screen used for the screen processing, the screen being for growing, in accordance with an increase in a pixel value of image data to undergo the screen processing, a dot generated centered on the first growth point, switching, when the pixel value exceeds a threshold value, a growth point from the first growth point to the second growth point, and growing, in accordance with increase in the pixel value, a dot generated centered on the second growth point; and a screen processing unit configured to perform the screen processing on the image data to be printed, using the screen generated by the generation unit.

According to another aspect of the present invention, there is provided an image processing method for performing screen processing on image data to be printed, the method comprising: deciding growth points for growing a screen used for the screen processing, based on a predetermined screen ruling and screen angle, the growth points being a first growth point that indicates a position at which a dot for generating a screen having a low ruling is generated, and a second growth point that is different from the first growth point and indicates a position at which a dot for increasing a screen ruling of a screen represented by the first growth point is generated; generating a screen used for the screen processing, the screen being for growing, in accordance with an increase in a pixel value of image data to undergo the screen processing, a dot generated centered on the first growth point, switching, when the pixel values exceed a threshold value, a growth point from the first growth point to the second growth point, and growing, in accordance with increase in the pixel value, a dot generated centered on the second growth point; and performing the screen processing on the image data to be printed, using the screen generated in the generating.

According to still another aspect of the present invention, there is provided a non-transitory computer-readable storage medium storing a computer program for causing a computer to execute an image processing method for performing screen processing on image data to be printed, the method comprising: deciding growth points for growing a screen used for the screen processing, based on a predetermined screen ruling and screen angle, the growth points being a first growth point that indicates a position at which a dot for generating a screen having a low ruling is generated, and a second growth point that is different from the first growth point and indicates a position at which a dot for increasing a screen ruling of a screen represented by the first growth point is generated; generating a screen used for the screen processing, the screen being for growing, in accordance with an increase in a pixel value of image data to undergo the screen processing, a dot generated centered on the first growth point, switching, when the pixel values exceed a threshold value, a growth point from the first growth point to the second growth point, and growing, in accordance with increase in the pixel value, a dot generated centered on the second growth point; and performing the screen processing on the image data to be printed, using the screen generated in the generating.

According to the present invention, it becomes possible to maintain stable gradation by applying a screen having a low ruling to a low density portion (highlight portion) of an image while reducing a toner consumption amount by applying a screen having an increased ruling to a high density portion of the image.

Further features of the present invention will become apparent from the following description of exemplary embodiments (with reference to the attached drawings).

BRIEF DESCRIPTION OF THE DRAWINGS

FIG. 4 is a diagram illustrating an example of screen processing.

FIGS. 9A and 9B are diagrams illustrating a threshold value for growth point switching.

FIGS. 10A and 10B are diagrams illustrating a threshold value for growth point switching.

FIGS. 11A and 11B are diagrams illustrating a toner-saving effect obtained by increasing a screen ruling.

FIGS. 14A to 14D are diagrams illustrating a method for generating a dither matrix.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Figure 1:
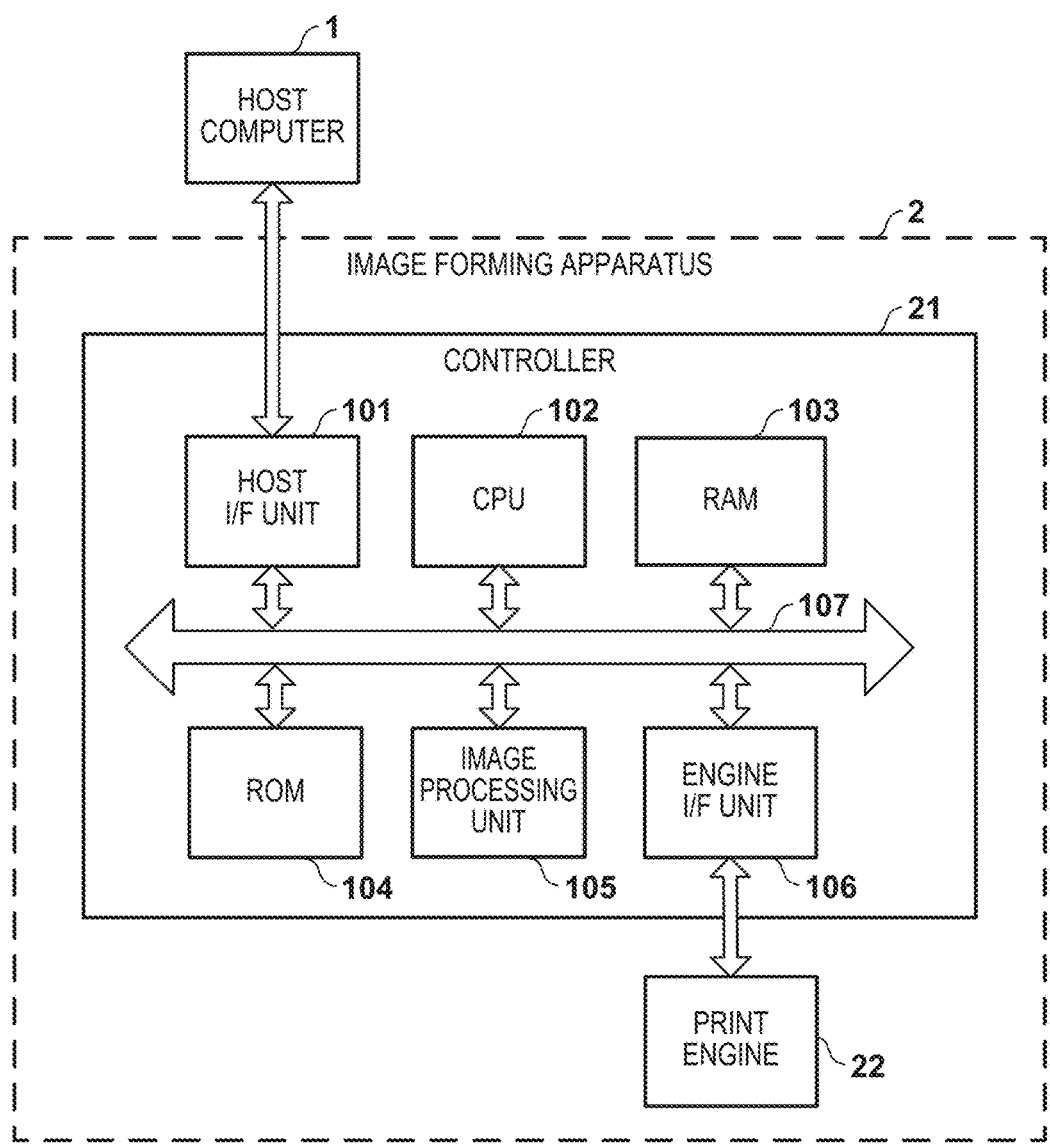
FIG. 1 is a block diagram showing a schematic configuration example of an image processing system.

Image Processing System FIG. 1 is a block diagram showing a schematic configuration example of an image processing system according to a first embodiment. As shown in FIG. 1, the image processing system is constituted by a host computer 1 and an image forming apparatus 2 that can communicate with the host computer 1 via a network. The image forming apparatus 2 is provided with a controller 21 and a print engine 22 controlled by the controller 21. Note that in this embodiment, the image forming apparatus 2 functions as an example of an image processing apparatus that performs screen processing on image data to be printed.

The host computer 1 is a computer such as a general PC (personal computer) or a WS (work station). Image data or document data generated by the host computer 1 is transmitted as print data written in PDL (Page Description Language) to the image forming apparatus 2. Note that PDL is a program language for designating how to arrange characters or figures in relation to a "page" that is to be printed or displayed.

The controller 21 is connected to the host computer 1 and the print engine 22. The controller 21 receives print data to be printed from the host computer 1 via a network, and converts the received print data into image data for use in printing (image formation) in the print engine 22. Furthermore, the controller 21 outputs the obtained image data to the print engine 22. The print engine 22 performs print processing based on the image data output from the controller 21. Note that in the case where an image reading apparatus (not illustrated) is connected to the image forming apparatus 2, the image data obtained from the image reading apparatus by processing for reading the original image may be input to the controller 21 as image data to be printed.

(Controller 21)

The controller 21 is provided with a host interface (I/F) unit 101, a CPU 102, an RAM 103, an ROM 104, an image processing unit 105 and an engine I/F unit 106 that are connected to each other via an internal bus 107, as shown in FIG. 1.

The host I/F unit 101 functions as a network I/F for receiving print data transmitted from the host computer 1. Examples of the network I/F include Ethernet (registered trademark) an I/F, a serial I/F and a parallel I/F. The CPU 102 performs overall control of the controller 21 and the image forming apparatus 2 using programs and data stored in the RAM 103 or the ROM 104, and executes various types of processing that will be described later. The RAM 103 is provided with a work area used when the CPU 102 executes the various types of processing. The ROM 104 stores various types of data such as programs and data used by the CPU 102 and setting data for the controller 21.

Upon receiving print data, the controller 21 interprets the content of the print data and performs rasterization processing for converting the print data into bitmap data, and thereby generates image data and attribute data of each color component in RGB color space. The image data has an eight-bit (256 gradations) value per pixel for each of the color components. The attribute data has a value indicating the attribute of the object (e.g., character, line, figure or image).

The image processing unit 105 generates image data to be printed by performing, on image data that is input, image processing for printing in the print engine 22 under the control of the CPU 102. The engine I/F unit 106 functions as an I/F to the print engine 22, and performs transfer control of the image data to be printed from the controller 21 to the print engine 22.

Image Forming Apparatus

Figure 2:
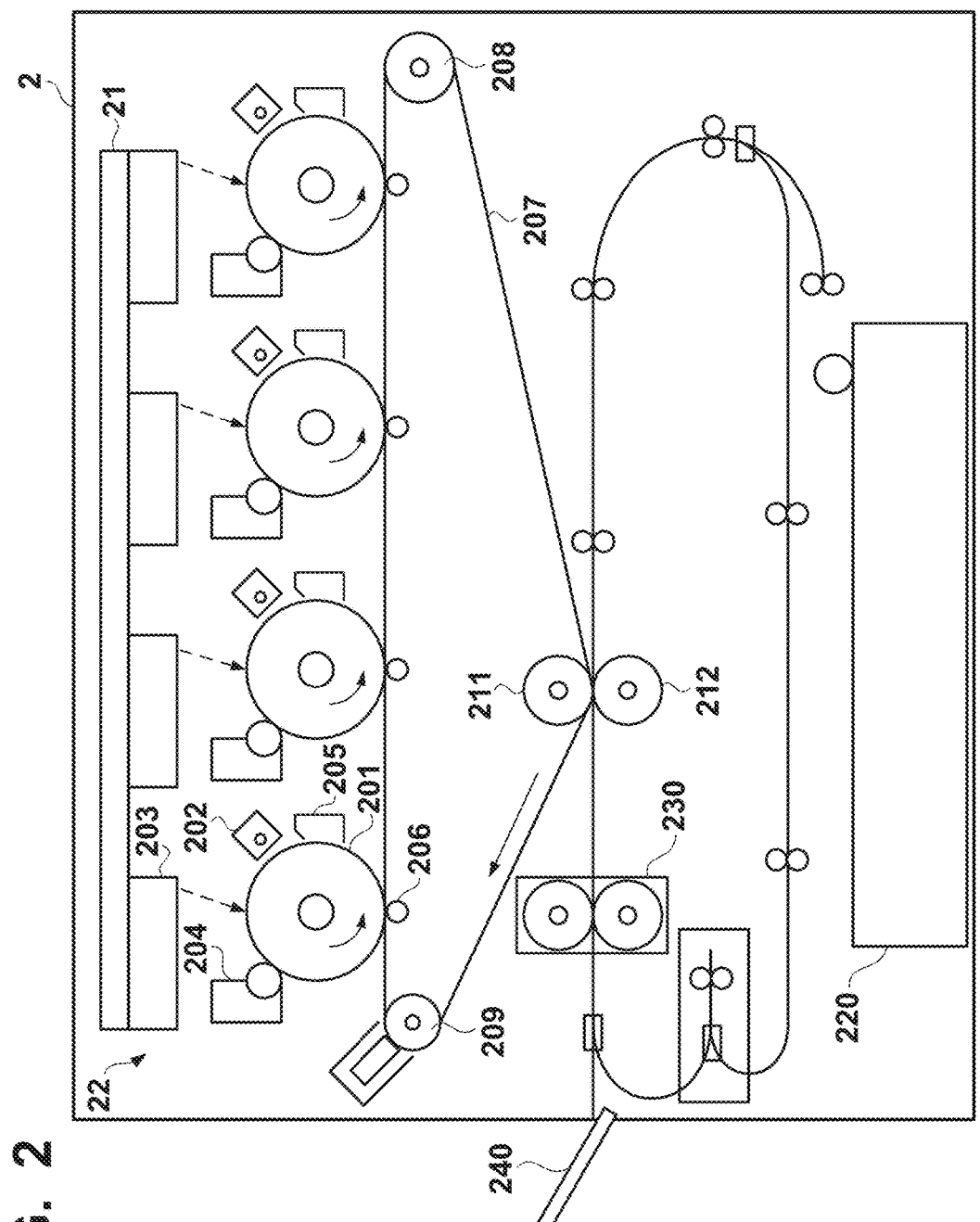
FIG. 2 is a cross-sectional view showing a schematic configuration example of an image forming apparatus.

FIG. 2 is a cross-sectional view showing a configuration example of the image forming apparatus 2. The image forming apparatus 2 may be an image forming apparatus that forms a single-color image, but here, an image forming apparatus for forming a multicolor image having a predetermined resolution (ex. 600 dpi) using toner (developing material) of a plurality of colors is envisioned. The image forming apparatus 2 may be any of a printing device, a printer, a copier, a multi-function peripheral (MFP), and a facsimile apparatus, for example.

The image forming apparatus 2 is provided with four image forming stations for forming toner images using toner of four colors, namely, yellow (Y), magenta (M), cyan (C)

and black (K). In FIG. 2, reference numerals are given only to the constituent elements of the Y color station, but all of the four stations can adopt the same configuration. Note that each of the stations corresponds to the print engine 22, and functions as an image forming unit for forming an image on an image carrier such as a photosensitive drum 201 or an intermediate transfer belt 207 using toner.

The photosensitive drum (photosensitive member) 201 is a cylindrical image carrier that carries an electrostatic latent image and a toner image, and rotates in the direction of the arrow shown in FIG. 2. A primary charging device 202, an exposure apparatus 203, a developing apparatus 204 and a cleaning apparatus 205 are arranged so as to face the outer peripheral surface of the photosensitive drum 201. In addition, a primary transfer roller 206 is arranged at a position facing the photosensitive drum 201 via the intermediate transfer belt 207.

The primary charging device 202 uniformly charges the rotating photosensitive drum 201. The exposure apparatus 203 outputs laser light (a laser beam) modulated based on image data (image information) and scans the surface of the photosensitive drum 201 using the laser light. Accordingly, an electrostatic latent image is formed on the photosensitive drum 201. The developing apparatus 204 develops the electrostatic latent image using toner, and forms a toner image on the photosensitive drum 201. The primary transfer roller 206 primary-transfers the toner image on the photosensitive drum 201 to the intermediate transfer belt 207. Note that toner retained on the surface of the photosensitive drum 201 after transferring the toner image to the intermediate transfer belt 207 is removed by the cleaning apparatus 205.

The intermediate transfer belt 207 rotates in the direction of the arrow shown in FIG. 2. The toner image on the intermediate transfer belt 207 is conveyed to a secondary transfer unit constituted by the intermediate transfer belt 207 and a secondary transfer roller 212. In the meantime, toner images of the respective colors formed on the photosensitive drums 201 of the stations are sequentially superimposed on the intermediate transfer belt 207 and are primary-transferred, whereby a multicolor toner image is formed on the intermediate transfer belt 207.

A sheet in a feeding cassette 220 is fed to a sheet conveyance path by feeding rollers. The sheet may be called recording paper, a recording material, a recording medium, paper, a transfer material, transfer paper or the like. The sheet fed to the sheet conveyance path is conveyed to the secondary transfer unit. In the secondary transfer unit, the toner image conveyed by the intermediate transfer belt 207 is secondary-transferred to the sheet. A fixing apparatus 230 applies heat and pressure to the toner image, and fixes the toner image to the sheet. After that, the sheet to which the toner image is fixed is discharged to a paper discharge tray 240.

Image Processing Unit

Figure 3A:
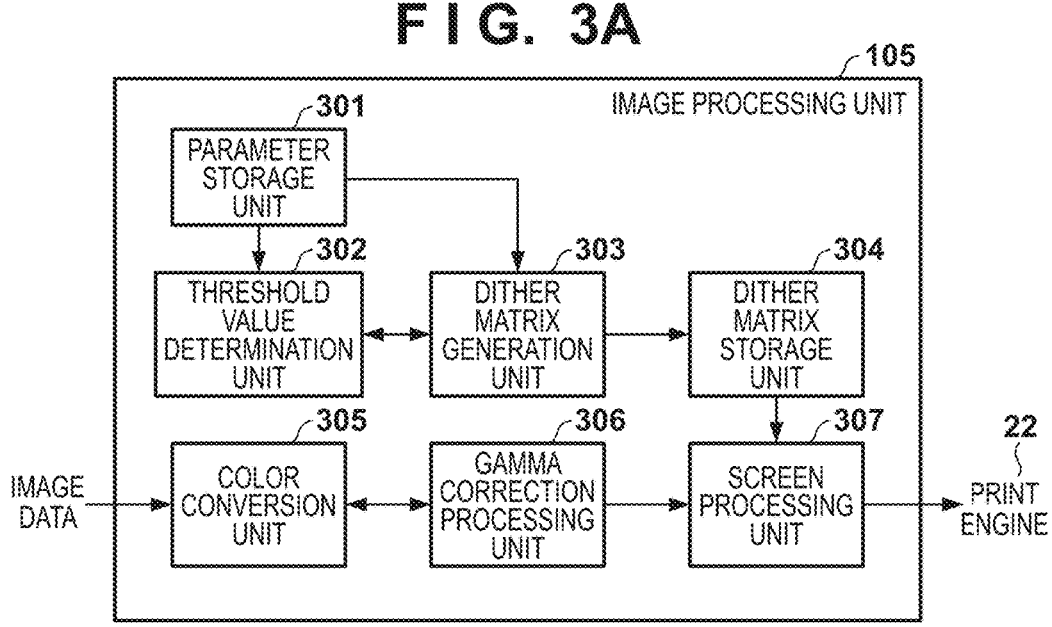
FIGS. 3A and 3B are block diagrams showing a configuration example of an image processing unit.

FIG. 3A is a block diagram showing a configuration example of the image processing unit 105 according to this embodiment. The image processing unit 105 is provided with a parameter storage unit 301, a threshold value determination unit 302, a dither matrix generation unit 303, a dither matrix storage unit 304, a color conversion unit 305, a gamma correction processing unit 306 and a screen processing unit 307. The image processing unit 105 performs image processing for printing on image data to be printed.

The parameter storage unit 301 stores parameters related to screen processing, and in this embodiment, stores a screen ruling and a screen angle used by a dither matrix generation unit 303. The screen ruling and screen angle stored in the parameter storage unit 301 may be values designated by a user or predetermined values.

The threshold value determination unit 302 obtains the screen ruling and screen angle stored in the parameter storage unit 301, and determines a threshold value for growth point switching by a method that will be described later.

The dither matrix generation unit 303 generates a dither matrix based on the screen ruling and screen angle read out from the parameter storage unit 301 and the threshold value for growth point switching that has been input from the threshold value determination unit 302. The dither matrix generation unit 303 stores the generated dither matrix to the dither matrix storage unit 304.

The color conversion unit 305 performs color conversion processing on image data read out from the RAM 103. In this color conversion processing, the image data, namely, image data in RGB color space is converted into image data of each color component (gradation value indicating density) in CMYK color space by processing using a color conversion lookup table (LUT) and matrix calculation. The image data after being converted is temporarily stored in a buffer (not illustrated).

The gamma correction processing unit 306 performs gamma correction processing on the image data input from the color conversion unit 305. In the gamma correction processing, the image data is corrected using a primary LUT such that desired density characteristics of the image are obtained when the image is formed on (transferred to) a sheet. In this embodiment, as an example, a primary LUT having the correction characteristics of a linear shape is used, and in this case, the input value will be output without being changed. However, the primary LUT used by the gamma correction processing unit 306 is overwritten by the CPU 102 in accordance with a change in the state of the print engine 22. The gamma correction processing unit 306 outputs the image data that underwent gamma correction processing to the screen processing unit 307.

The screen processing unit 307 performs screen processing on the image data that has been input, and outputs the image data that underwent screen processing. The image data output from the screen processing unit 307 is sent to the exposure apparatus 203 of the print engine 22, and is used for image formation on a sheet.

Screen Processing

Next, screen processing (binarization processing) performed by the screen processing unit 307 will be described with reference to FIG. 4. Screen processing is processing for converting image data from a continuous gradation into an area gradation (namely, a gradation per unit area expressed by the ratio of the area of a region to which toner is to adhere (a region to be colored with toner) to the area of a region to which toner is not to adhere (a region not to be colored with toner)). A dither matrix is used for screen processing, and the pixel values of the pixels of image data to be processed are binarized using the dither matrix. The dither matrix corresponds to a threshold value table indicating the growth of the screen that is based on an increase in the pixel values (density) of the input image.

FIG. 4 shows image data 401 to undergo screen processing, a dither matrix 402 to be used for the screen processing and screen image data 403 obtained by the screen processing. When the image data 401 is input, the screen processing unit 307 focuses on each of the pixels of the image data, and compares the pixel value of the pixel of interest to a threshold value of the dither matrix 402 that is stored in the dither matrix storage unit 304 and corresponds to the pixel of interest. The screen processing unit 307 outputs 0 or the maximum gradation value as the pixel value of the pixel of interest in accordance with the result of the comparison.

Specifically, in the case where the result of the above-described comparison indicates that the pixel value of the pixel of interest of the image data 401 exceeds the threshold value of the dither matrix 402, the pixel value of the pixel of interest of the screen image data 403 will be the maximum gradation value. On the other hand, in the case where the pixel value of the pixel of interest of the image data 401 is less than or equal to the threshold value of the dither matrix 402, the pixel value of the pixel of interest of the screen image data 403 will be 0. In the example shown in FIG. 4, in the case where the result of screen processing using the dither matrix 402 on the image data 401 in which the pixel values of the pixels are 130 indicates that the pixel value of each of the pixels exceeds a corresponding threshold value, the pixel value of the corresponding pixel of the screen image data 403 will be 255. On the other hand, in the case where the pixel value of each of the pixels is less than or equal to a corresponding threshold value, the pixel value of the corresponding pixel of the screen image data 403 will be 0.

In this embodiment, the dither matrix generation unit 303 can change the image (screen image) represented in accordance with the screen image data obtained by screen processing by changing each of the threshold values included in the dither matrix used by the screen processing unit 307.

Dither Matrix Generation Processing

Next, dither matrix generation processing performed by the dither matrix generation unit 303 will be specifically described with reference to FIGS. 5A to 5E. FIGS. 5A to 5E are diagrams each showing a growth example of a screen that is based on a dither matrix generated in accordance with dither matrix generation processing. In this embodiment, a screen represented by a dither matrix generated by the dither matrix generation unit 303 has two types of growth points. Here, the growth point indicates a position at which a dot of the screen is to be generated, and indicates a position that is a center of the dot when generating the dot. By setting pixels around the growth point as targets for adhering toner (targets for coloring with toner) in accordance with the increase in pixel values (density) of the input image, the dot expands centered on the growth point, that is in other words, the screen grows.

First, the dither matrix generation unit 303 obtains the screen ruling and the screen angle stored in the parameter storage unit 301, and determines the positions (coordinates) of first growth points. The dither matrix generation unit 303 obtains a threshold value for growth point switching from the threshold value determination unit 302. In this embodiment, assume that the screen ruling and screen angle stored in the parameter storage unit 301 are respectively 134 lines and 72 degrees (−18 degrees), and that these values are used for dither matrix generation processing by the dither matrix generation unit 303. The dither matrix generation unit 303 determines a screen growth point group that represents the obtained screen ruling and screen angle, and determines the coordinates of the determined screen growth point group as the coordinates of a first growth point group.

Next, the dither matrix generation unit 303 determines the coordinates of second growth points so as to satisfy the following three conditions.

First condition: the coordinates of the second growth points are coordinates different from the coordinates of the first growth points.

Second condition: the coordinates of the second growth points are coordinates that allow the screen ruling of a screen represented by the first growth point group and a second growth point group to be $2^{1/2}$ times the screen ruling of a screen represented by the first growth point group.

Third condition: the coordinates of the second growth points are coordinates that allow the screen angle of a screen represented by the first growth point group and the second growth point group to be an angle obtained by adding 45 degrees to the screen angle of a screen represented by the first growth point group.

Figure 5C:
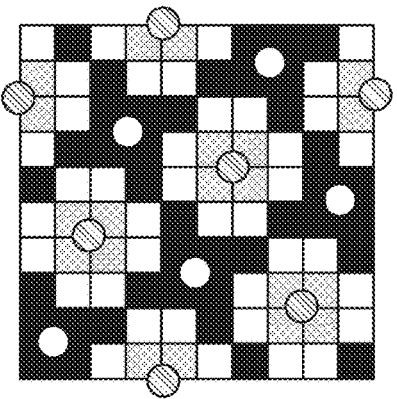
FIGS. 5A to 5E are diagrams illustrating a method for generating a dither matrix.
Figure 5B:
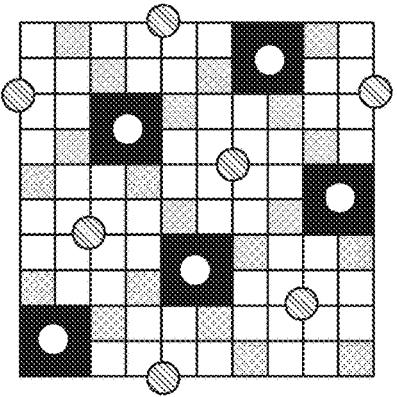
Figure 5A:
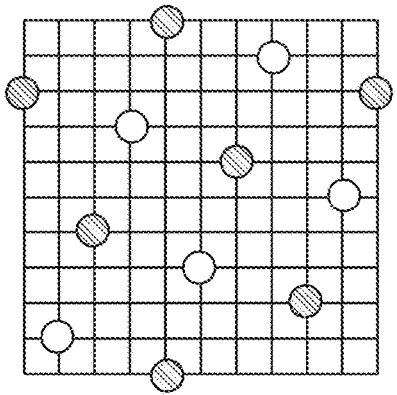

In this embodiment, FIG. 5A shows a screen represented by a first growth point group and a second growth point group. In the screen shown in FIG. 5A, regarding the first growth point group and the second growth point group, the second growth points are determined so as to be the center of a screen in which the screen ruling is 190 lines ($\approx 134$ lines$\times 2^{1/2}$) and the screen angle is 117 degrees (=72 degrees+45 degrees) (27 degrees).

Next, the dither matrix generation unit 303 sets threshold values of the dither matrix such that dots expand centered on the determined first growth points and the screen grows. In this embodiment, the threshold values of the dither matrix are set such that the screen shown in FIG. 5A grows in accordance with the increase in pixel values of the input image as shown in FIGS. 5B and 5C.

Figure 5E:
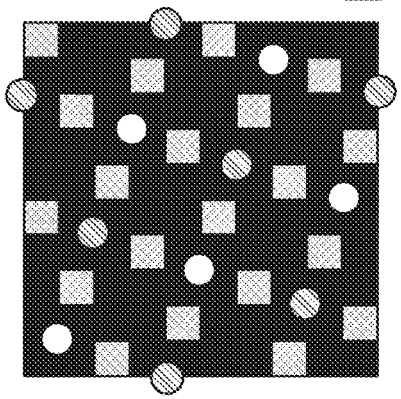
Figure 5D:
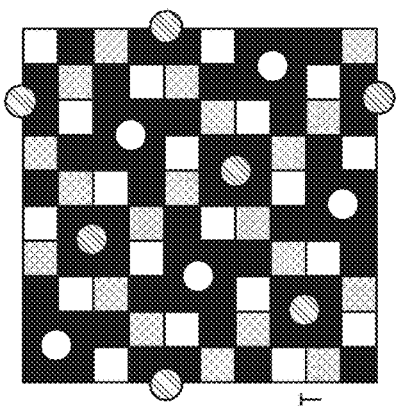

After that, when the pixel values of the input image exceed the threshold value for growth point switching determined by the threshold value determination unit 302, the dither matrix generation unit 303 sets the threshold values of the dither matrix such that the growth points of the screen change from the first growth points to the second growth points. In this embodiment, the threshold values of the dither matrix are set such that the screen shown in FIG. 5C grows due to dot expansion centered on the second growth points as shown in FIGS. 5D and 5E.

Procedure of Dither Matrix Generation Processing

Figure 6:
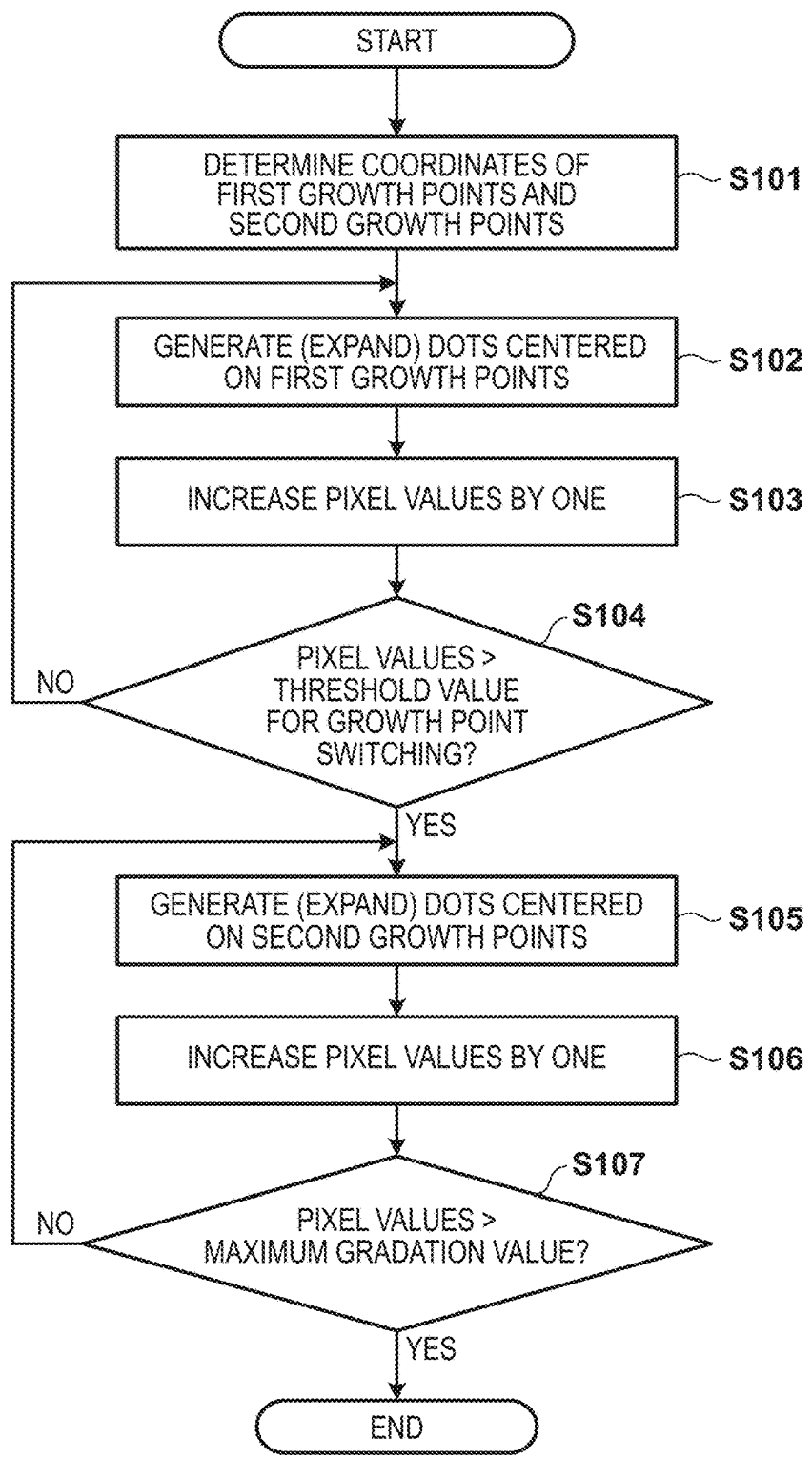
FIG. 6 is a flowchart showing a procedure for generating a dither matrix according to a first embodiment.

FIG. 6 is a flowchart showing a procedure of dither matrix generation processing executed by the dither matrix generation unit 303 in this embodiment. In this embodiment, a dither matrix having N gradations (for example, N=256 corresponding to eight bits per pixel) is generated. Note that the processing in each step shown in FIG. 6 is achieved in the image forming apparatus 2 by the CPU 102 reading out a control program stored in the ROM 104 and executing the control program.

In step S101, the dither matrix generation unit 303 determines the coordinates of first growth points and second growth points based on the screen ruling and the screen angle obtained from the parameter storage unit 301. Next, in step S102, the dither matrix generation unit 303 sets the threshold values of a dither matrix such that dots are generated centered on the determined first growth points. Furthermore, the dither matrix generation unit 303 sets the threshold values of the dither matrix such that the dots expand (grow) centered on the first growth points and the screen grows while increasing the pixel values of the input image one at a time in step S103. The dither matrix generation unit 303 repeats such processing until it is determined in step S104 that the pixel values of the input image have exceeded the threshold value for growth point switching.

When the pixel values of the input image exceed the threshold value for growth point switching, the dither matrix generation unit 303 sets the threshold values of the dither matrix such that the growth points of the screen change from the first growth points to the second growth points and dots are generated centered on the second growth points in step S105. Furthermore, the dither matrix generation unit 303 sets the threshold values of the dither matrix such that the dots expand (grow) centered on the second growth points and the screen grows while increasing the pixel values of the input image one at a time in step S106. The dither matrix generation unit 303 repeats such processing until it is determined in step S107 that the pixel values of the input image have exceeded the increase/decrease in gradation value (maximum gradation value). The dither matrix generation unit 303 ends the dither matrix generation processing if it is determined in step S107 that the pixel values have exceeded the maximum gradation value.

Determination of Positions (Coordinates) of Second Growth Points

Figure 7A:
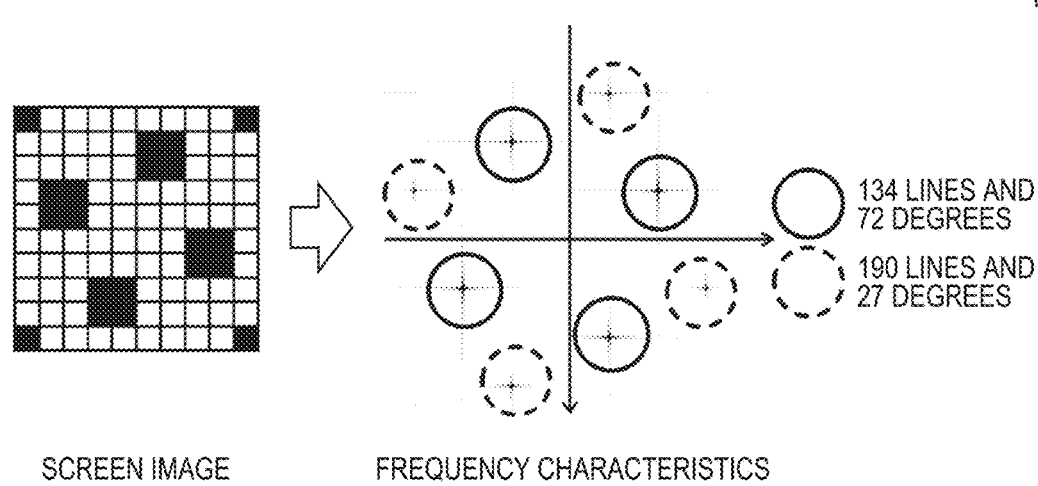
FIGS. 7A and 7B are diagrams illustrating a method for determining a position of a second growth point.

Next, a method for determining the positions (coordinates) of second growth points by the dither matrix generation unit 303 will be described with reference to FIGS. 7A and 7B. FIG. 7A is a diagram showing a screen image having only first growth points (having dots generated at first growth points), and the frequency characteristics of the screen image. Also FIG. 7B is a diagram showing a screen image having first growth points and second growth points (having dots generated at first growth points and second growth points), and the frequency characteristics of the screen image.

As described above, the dither matrix generation unit 303 generates a dither matrix for changing the growth points from the first growth points to the second growth points when the pixel values of the input image exceed the threshold value for growth point switching. At this time, if the positions of the second growth points are not appropriately determined, this can cause image quality deterioration such as multicolor moire to occur. Such multicolor moire corresponds to a virtual pattern generated by interference of a screen having two different colors (ex., B and C colors) in the case of forming a multicolor image.

The screen image having only first growth points shown in FIG. 7A is a screen image having the screen ruling (=134 lines) and the screen angle (=72 degrees) stored in the parameter storage unit 301 as described above. The frequency characteristics of this screen image originally include not only the frequency component of a screen in which the screen ruling is 134 lines and the screen angle is 72 degrees, but also the frequency component of a screen in which the screen ruling is 190 lines and the screen angle is 27 degrees.

Figure 7B:
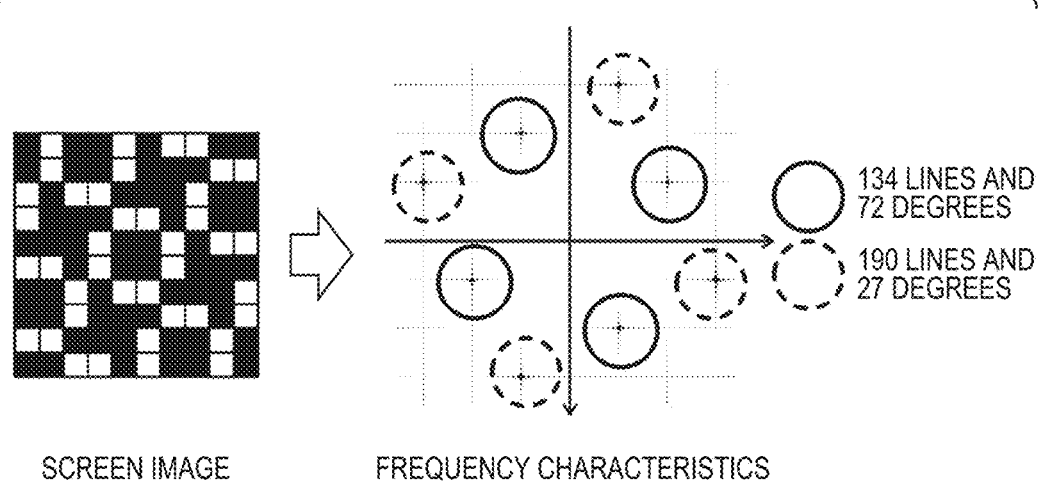

In this embodiment, the dither matrix generation unit 303 determines the coordinates of the second growth points such that the screen image shown in FIG. 7B and having the first growth points and the second growth points does not have a frequency component different from that of the screen image shown in FIG. 7A and having the first growth points only. Specifically, in the example shown in FIG. 7B, the second growth points are determined such that the frequency component of the screen that is based on the first growth points and the second growth points is the frequency component of a screen in which the screen ruling is 190 lines and the screen angle is 27 degrees.

By determining the coordinates of the second growth points in this manner, even if the growth points change from the first growth points to the second growth points, the screen image having the changed growth points will not include a frequency component that is different from that of the screen image having the growth points before being changed. Accordingly, it is possible to prevent the occurrence of new moire components due to the change of the growth points, and to prevent the occurrence of the above-described image quality deterioration.

Determination of Threshold Value for Growth Point Switching

Figure 8A:
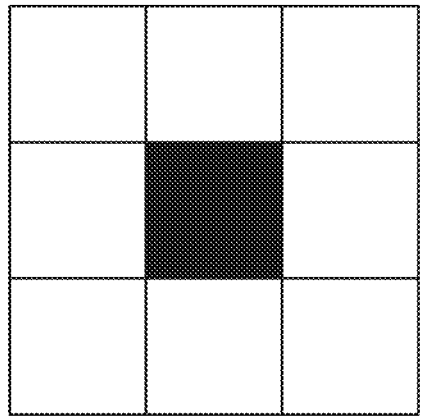
FIGS. 8A and 8B are diagrams illustrating a threshold value for growth point switching.
Figure 8B:
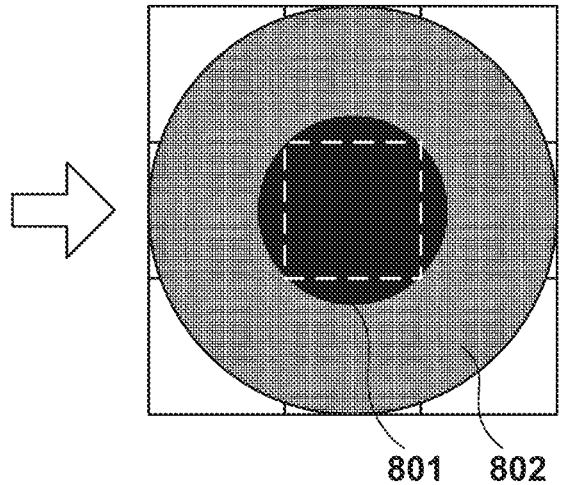

Next, a method for determining a threshold value for growth point switching by the threshold value determination unit 302 will be described with reference to FIGS. 8A to 10B. FIG. 8B shows an electrostatic latent image formed on the photosensitive drum 201 when printing a screen image shown in FIG. 8A onto a sheet. FIG. 9B shows an electrostatic latent image formed on the photosensitive drum 201 when printing a screen image shown in FIG. 9A onto a sheet. FIG. 10B shows an electrostatic latent image formed on the photosensitive drum 201 when printing a screen image shown in FIG. 10A onto a sheet.

The diameter of a light beam used for exposure by the exposure apparatus 203 is usually greater than one side of one pixel in order to sufficiently cover the area of the pixel. Therefore, in the case of printing a screen image such that only one pixel is colored (undergoes toner adherence) as shown in FIG. 8A, exposure is performed such that, on the photosensitive drum 201, toner adheres in the range of a region 801 shown in FIG. 8B and an electrostatic latent image is formed. At this time, on the photosensitive drum 201, the potentials of not only the pixels in the region 801 but also pixels that surround the region 801 and in which the toner does not adhere (pixels within the range of a region 802) change (rise) due to the exposure.

In this embodiment, the threshold value determination unit 302 determines the threshold value for growth point switching using the above-described potential characteristics of the electrostatic latent image formed on the photosensitive drum 201. Here, FIGS. 9A and 9B correspond to a screen in which dots are generated at first growth points, and FIGS. 10A and 10B correspond to a screen in which growth has progressed (dots expanded) further than in FIGS. 9A and 9B. In addition, in FIGS. 9A, 9B, 10A and 10B, the positions of the second growth points are shown. Comparing FIG. 9B and FIG. 10B, the potentials of pixels adjacent to the second growth points have increased by the expansion of the dots at the first growth points. This is because the electrostatic latent image is formed (in other words, the potential changes) not only in the ranges of dots at the first growth points but also in surrounding pixels.

In this case, it is possible to form dots at the second growth points in a more stable manner by switching the growth points (from the first growth points to the second growth points) in the state shown in FIGS. 10A and 10B than by switching the growth points in the state shown in FIGS. 9A and 9B. This is because the potential of the electrostatic latent image at the positions of the second growth points on the photosensitive drum 201 is higher in the state shown in FIG. 10B than in the state shown in FIG. 9B, and the higher the potential of the electrostatic latent image is, the more stably the toner adheres (the more stably the electrostatic latent image is developed).

Therefore, it is sufficient that the threshold value determination unit 302 determines, as the threshold value for growth point switching, pixel values (of an input image) corresponding to the screen images shown in FIGS. 10A and 10B that allow a screen to grow at the second growth points in a more stable manner than the screen images shown in FIGS. 9A and 9B. That is, it is sufficient that the threshold value determination unit 302 determines the threshold value for growth point switching based on the potential of the electrostatic latent image formed at the second growth points on the photosensitive drum 201 (on the image carrier) when forming dots at the first growth points.

By performing the above-described dither matrix generation processing using the threshold value for growth point switching determined in this manner, a screen having stable gradation can be generated. A screen that is applied to a highlight portion of an image grows as a screen having a low ruling, and thus stable gradation can be maintained. In addition, in a screen that is applied to a portion having a density that exceeds a threshold value, the screen ruling is increased in a state where the potential at the positions of the second growth points on the photosensitive drum 201 has risen to a relatively high level, and thus it is possible to reduce the toner consumption amount while maintaining a stable gradation.

Toner Saving Effect

Next, a toner saving effect according to this embodiment will be described with reference to FIGS. 11A, 11B and 12. FIGS. 11A and 11B show image data in which dots corresponding to two pixels are arranged at different positions, and a state in which the pixels are formed (colored) by toner on a sheet based on the image data. As described above, in electrophotographic image formation (printing), in the case of coloring one pixel with toner, the toner adheres over a range broader than one pixel on the sheet (on the photosensitive drum 201). Therefore, in the case of coloring two adjacent pixels using toner as shown in FIG. 11A, the ranges over which toner adheres to the sheet (the photosensitive drum 201) overlap between the pixels. On the other hand, in the case of coloring two separated pixels with toner as shown in FIG. 11B, the ranges over which the toner adheres to the sheet do not overlap in such a manner.

Comparing FIG. 11A and FIG. 11B, the density of pixels that are formed is higher in the case of the image data in FIG. 11B in which an area over which the toner adheres to the sheet is broader. Therefore, in the case of forming dots corresponding to the same number of pixels, the pixels can be formed on the sheet so as to have a higher density by arranging the pixels such that pixels colored by the toner are not adjacent to each other (that is, the peripheral lengths of the colored pixels is extended).

In addition, comparing a screen having a low ruling (corresponding to FIG. 11A) and a screen having a high ruling (corresponding to FIG. 11B), the growth of the screen having a low ruling is characterized in that the number of growth points are small but the dot generated at each of the growth points is large. On the other hand, the growth of the screen having a high ruling is characterized in that the number of growth points is large and the dot generated at each of the growth points is small. Therefore, pixels having a higher density can be formed with the same amount of toner using the screen having a high ruling than the screen having a low ruling. The fact that pixels having a higher density can be formed using the same amount of toner as described above means that pixels having the same density can be formed using a smaller amount of toner. Therefore, pixels having the same density can be formed with a smaller amount of toner using a screen having a high ruling than using a screen having a low ruling, or in other words, the toner consumption amount can be reduced.

In this embodiment, when the pixel values of the input image exceed the threshold value for growth point switching, the growth points are changed from the first growth points to the second growth points and dots centered on the second growth points are generated, thereby growing the screen. In this manner, due to the change of the growth points, dots centered on the second growth point group are generated in addition to dots centered on the first growth point group that have been generated and expanded, and thereby the screen ruling of the screen image is increased.

Figure 12:
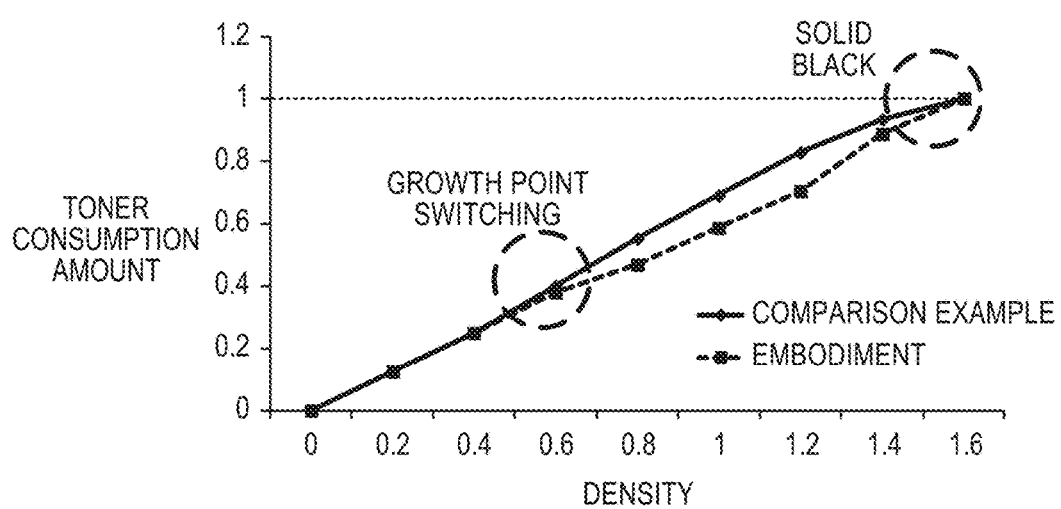
FIG. 12 is a graph showing a relationship between a density of black toner and a toner consumption amount.

Here, FIG. 12 is a diagram showing the relationship between a toner density and a toner consumption amount in the case of performing image formation by applying screen processing according to this embodiment and using K color toner. Note that FIG. 12 shows, as a comparison example, characteristics in the case of performing image formation by applying screen processing that uses a screen (dither matrix) whose screen ruling is 134 lines. Also, the toner consumption amount is normalized with a toner consumption amount corresponding to the maximum gradation value (solid black). Comparing the characteristics of this embodiment to the characteristics of the comparison example, in a region in which the pixel values of the input image exceed the threshold value for growth point switching, the toner consumption amount is smaller than in the comparison example. That is, according to this embodiment, the toner consumption amount can be reduced by increasing the screen ruling of the screen image when forming pixels having a relatively high density corresponding to pixel values that exceed the threshold value for growth point switching.

As described above, in this embodiment, the dither matrix generation unit 303 first determines growth points for growing a screen used for screen processing based on a predetermined screen ruling and screen angle stored in the parameter storage unit 301. Specifically, the dither matrix generation unit 303 determines first growth points indicating positions at which dots for generating a screen having a low ruling are generated, and second growth points that indicate positions at which dots for increasing the screen ruling of the screen represented by the first growth points are generated and that are different from the first growth points. Furthermore, the dither matrix generation unit 303 generates a screen used for screen processing based on the determined first growth points and second growth points. The screen is generated as a screen in which dots generated centered on the first growth points grow in accordance with an increase in pixel values of the input image, and when the pixel values exceed a threshold value, the growth points are switched from the first growth points to the second growth points, and the dots generated centered on the second growth points grow in accordance with the increase in pixel values. The screen processing unit 307 performs the above-described screen processing on image data to be printed using the screen generated by the dither matrix generation unit 303.

According to this embodiment, stable gradation can be maintained by applying a screen having a low ruling to a low density portion (highlight portion) of an image to be printed. Furthermore, the toner consumption amount can be reduced by applying a screen having an increased ruling to a high density portion of the image to be printed.

In this embodiment, description was given on screen processing in the case where an image to be formed is a single-color image, but screen processing in the case where an image to be formed is a multicolor image can be similarly realized. Even if a screen grows in accordance with increase in pixel values of an input image and the growth points change from first growth points to second growth points, new frequency components do not occur due to the change of the growth points as described above. Therefore, according to this embodiment, also in the case of forming a multicolor image, the screen ruling can be increased in correspondence with each color without generating frequency components that cause new multicolor moire components.

Second Embodiment

In the first embodiment, the position of the second growth point group is determined such that the screen ruling of a screen represented by the first growth point group and the second growth point group is $2^{1/2}$ times the screen ruling of a screen represented by the first growth point group. Accordingly, the screen represented by the first growth point group and the second growth point group does not have a frequency component different from that of the screen represented only by the first growth point group, thereby preventing the occurrence of multicolor moire due to the change of the growth points. On the other hand, in the case where an image to be formed is a single-color image, the image to be formed does not include multicolor representation, and thus suppression of the toner consumption amount needs to be focused on more than gradation stability. Therefore, in a low density portion (highlight portion), it is desirable to apply, to a moderate to high density portion of an image, a screen having a ruling increased as much as possible to an extent to which gradation is not adversely affected, while applying a screen for realizing stable gradation.

In view of this, in a second embodiment, it is determined whether or not an image to be formed is a single-color image (single-color image or a multicolor image), and in the case of forming a single-color image, the ruling of the screen is increased by adding growth points so as to represent the screen with an integer multiple of the screen ruling in accordance with the increase in pixel values. For simplification, description in common with the first embodiment is omitted, and portions different from the first embodiment will be described below.

Figure 3B:
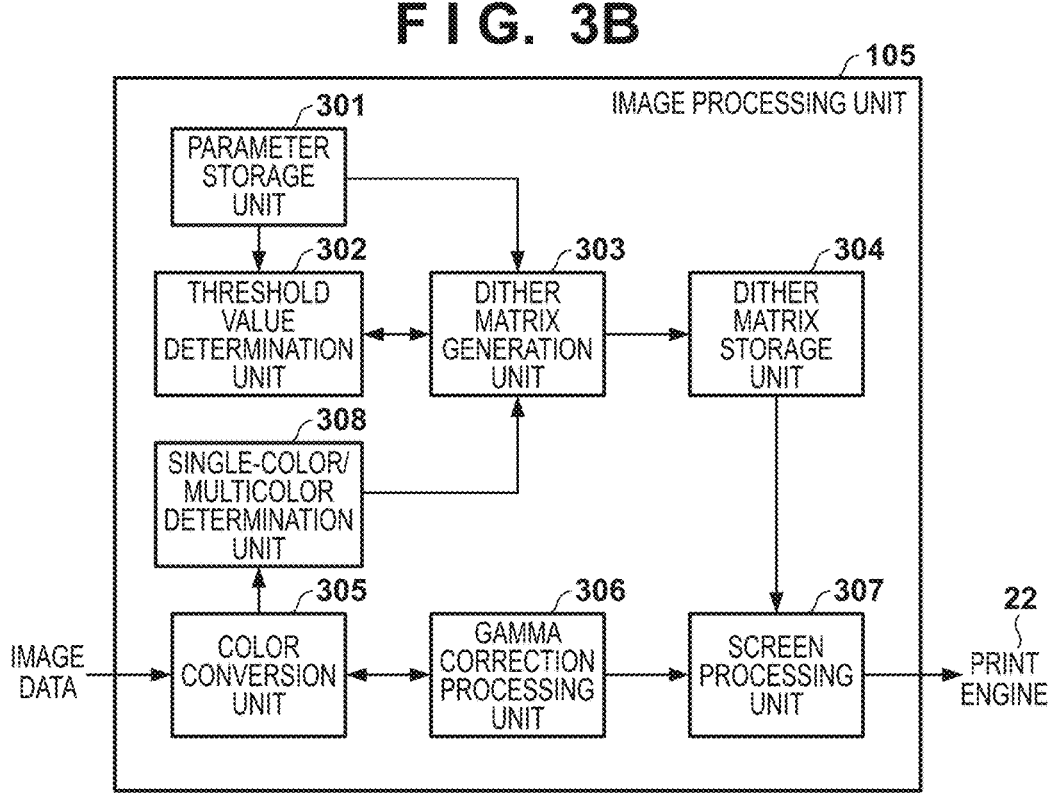

FIG. 3B is a block diagram showing a configuration example of the image processing unit 105 according to this embodiment, and compared to the first embodiment (FIG. 3A), a single-color/multicolor determination unit 308 is added. In this embodiment, it is assumed that, regarding the screen ruling and screen angle at first growth points of a single color (B color) screen, 106 lines as the screen ruling and 45 degrees as the screen angle are stored in the parameter storage unit 301.

The single-color/multicolor determination unit 308 determines whether an input image is a single-color image or a multicolor image (whether or not the input image is a single-color image), and outputs the determination result to the dither matrix generation unit 303. In the case where the input image is a multicolor image, the dither matrix generation unit 303 generates a screen (dither matrix) as in the first embodiment, whereas in the case where the input image is a single-color image, a screen is generated as follows.

Specifically, the dither matrix generation unit 303 determines the positions (coordinates) of growth points other than the first growth points such that a screen represented by first to Mth growth point groups (M is an integer greater than or equal to two) becomes a screen having a screen ruling of an integer multiple of the screen ruling of the screen represented by the first growth point group and the same screen angle as the screen angle of the screen represented by the first growth point group. In this embodiment, for example, the positions (coordinates) of the second growth points, third growth points and fourth growth points are determined such that a screen having 212 lines and 45 degrees can be represented by the first growth point group, the second growth point group, a third growth point group and a fourth growth point group.

Figure 13:
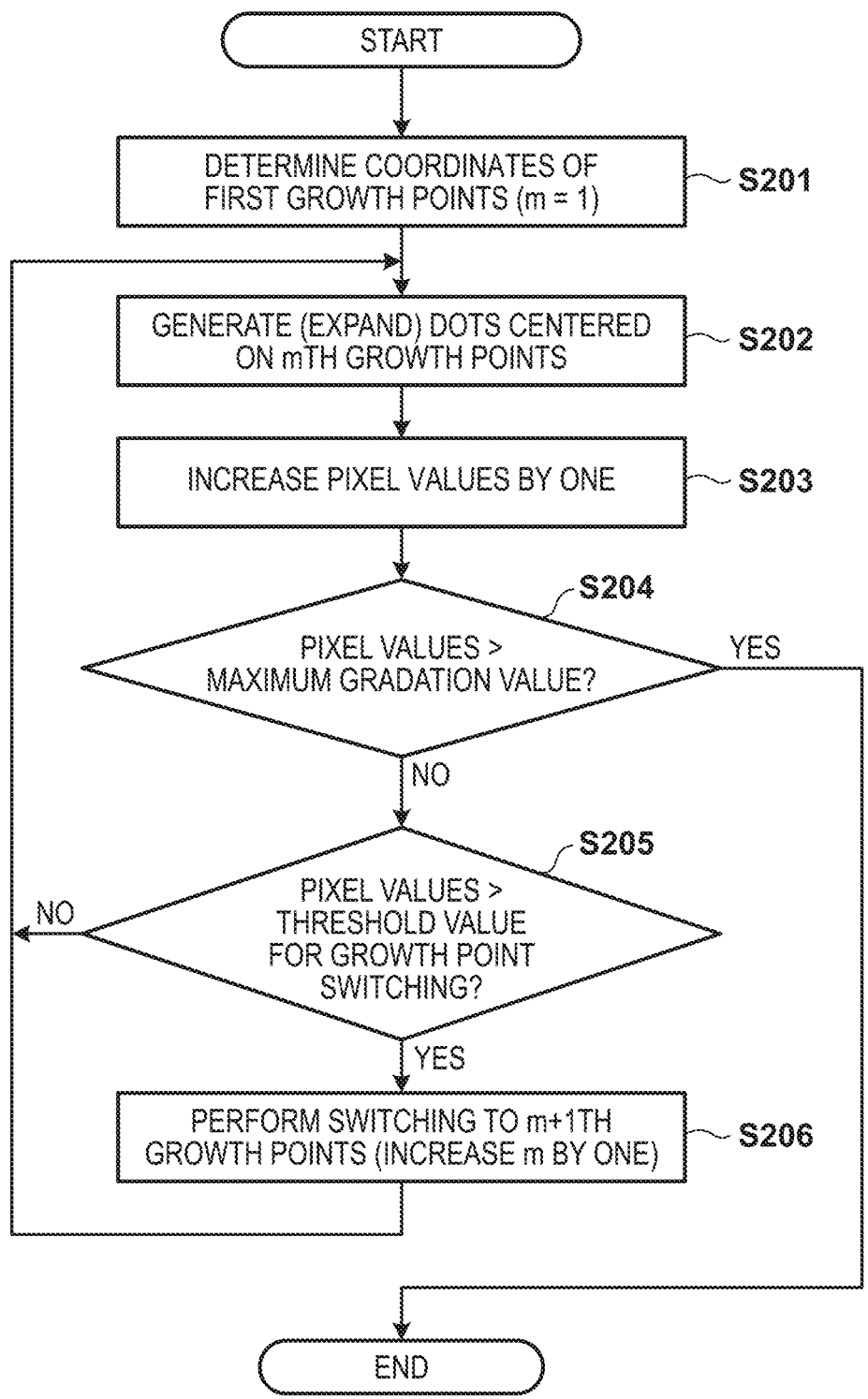
FIG. 13 is a flowchart showing a procedure for generating a dither matrix according to the second embodiment.

FIG. 13 is a flowchart showing a procedure of dither matrix generation processing executed by the dither matrix generation unit 303 of this embodiment. Note that the processes of steps shown in FIG. 13 are realized in the image forming apparatus 2 by the CPU 102 reading out a control program stored in the ROM 104 and executing the control program.

In step S201, the dither matrix generation unit 303 determines the coordinates of the first to Mth growth points based on a screen ruling and screen angle obtained from the parameter storage unit 301 and a determination result obtained from the single-color/multicolor determination unit 308. Note that a counter m is set to 1. Next, in step S202, the dither matrix generation unit 303 sets the threshold values of a dither matrix such that dots are generated centered on the determined m-th growth points. Furthermore, the dither matrix generation unit 303 sets the threshold values of the dither matrix such that the dots expand (grow) centered on the first growth points and the screen grows while increasing the pixel values of the input image one at a time in step S203. The dither matrix generation unit 303 repeats such processing until it is determined in step S204 that the pixel values of the input image have exceeded the increase/decrease in gradation value (maximum gradation value), or it is determined in step S205 that the pixel values of the input image have exceeded the threshold value for growth point switching.

If the dither matrix generation unit 303 determines in step S204 that the pixel values have exceeded the maximum gradation value, the dither matrix generation unit 303 ends the dither matrix generation processing. Moreover, when the pixel values of the input image exceed the threshold value for growth point switching in step S205, the dither matrix generation unit 303 increases the value of the counter m by one in step S206, and performs growth point switching of the screen. After that, the dither matrix generation unit 303 returns the procedure to step S202, sets the threshold values of the dither matrix such that dots are generated centered on an (m+1)-th growth point, and performs the processing of step S203 onward again.

FIGS. 14A to 14D are diagrams each showing a growth example of a screen based on a dither matrix generated according to dither matrix generation processing of this embodiment. FIG. 14A shows a screen represented by a first growth point group, and the screen ruling of the screen is 106 lines and the screen angle is 45 degrees. These values correspond to the screen ruling and screen angle stored in advance in the parameter storage unit 301. Moreover, FIG. 14B shows a screen represented by a first growth point group and a second growth point group, FIG. 14C shows a screen represented by a first growth point group, a second growth point group and a third growth point group, and FIG. 14D shows a screen represented by a first growth point group and a second growth point group, a third growth point group and a fourth growth point group.

In the examples shown in FIGS. 14A to 14D, the threshold value for growth point switching is determined by the threshold value determination unit 302 such that the screen represented by the first growth point group, the second growth point group, the third growth point group and the fourth growth point group has a screen ruling of 212 lines and a screen angle of 45 degrees. Specifically, the threshold value determination unit 302 determines the threshold value such that the shape of a dot generated at each growth point will be the shape of a dot corresponding to 2 pixels×2 pixels. Note that when dots corresponding to 2 pixels×2 pixels are generated at the first to fourth growth points, the dither matrix generation unit 303 may return the growth points to the first growth points so as to grow dots corresponding to 4 pixels.

In this embodiment, by applying a screen having a low ruling to a low density portion (highlight portion) of an image, representation with a stable density in the highlight portion is enabled. Furthermore, a dot corresponding to 2 pixels×2 pixels is generated at each growth point, and a screen is allowed to grow while adding first to Mth growth points such that the number of lines is an integer multiple thereof. Accordingly, by enabling application of a screen having a ruling increased as much as possible, it is possible to perform image formation of a high density portion while maintaining the gradation and suppressing the toner consumption amount.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-165153, filed Aug. 24, 2015, which is hereby incorporated by reference herein in its entirety.

What is claimed is:

1. An image processing apparatus comprising:
a printer which prints images on a sheet;
a controller, comprising a processor that executes instructions stored in a memory or comprising circuitry, the controller being configured to:
(a) perform screen processing on the image data using a dither matrix including a plurality of threshold values, so as to generate an image after the screen processing; and
(b) cause the printer to print the image after the screen processing on a sheet,
wherein a screen represented by the dither matrix has first and second growth points each indicating a central position at which a halftone dot is generated,
wherein, in the image after the screen processing,
(i) a first region having a density lower than a predetermined density is represented by first halftone dots around the first growth point, and the plurality of thresholds of the dither matrix are arranged so that the first halftone dots have first screen rulings and first screen angles in the first region, and
(ii) a second region having a density being equal or greater than the predetermined density is represented by combining the first halftone dots around the first growth point and second halftone dots around second growth points adjacent to the first growth points, and the plurality of thresholds of the dither matrix are arranged so that combined first halftone dots and second halftone dots have screen rulings higher than the first screen rulings and second screen angles being different from the first screen angles at a predetermined angle in the second region.

2. The image processing apparatus according to claim 1, wherein the first growth point is decided as a growth point that represents a screen having a predetermined screen ruling and screen angle, and
wherein the second growth point is decided such that a screen represented by the first growth point and the second growth point does not include a frequency component different from a frequency component included in the screen represented by the first growth point.

3. The image processing apparatus according to claim 2, wherein the second growth point is decided such that a screen ruling of the screen represented by the first growth point and the second growth point is $2^{1/2}$ times a screen ruling of the screen represented by the first growth point, and a screen angle of the screen represented by the first growth point and the second growth point is an angle obtained by adding 45 degrees to a screen angle of the screen represented by the first growth point.

4. The image processing apparatus according to claim 1, wherein the plurality of threshold values are decided based on a potential at the second growth point on an image carrier, the potential being changed by formation of an electrostatic latent image on the image carrier when printing a dot generated centered on the first growth point.

5. The image processing apparatus according to claim 1, wherein the controller is further configured to determine whether or not the image data is image data of a single-color image, and
wherein if it is determined that the image data to undergo the screen processing is image data of a single-color image, the second growth point is decided such that a screen ruling of the screen represented by the first growth point and the second growth point is an integer multiple of the screen ruling of the screen represented by the first growth point, and a screen angle of the screen represented by the first growth point and the second growth point is equal to the screen angle of the screen represented by the first growth point.

6. The image processing apparatus according to claim 5, wherein the plurality of threshold values are decided based on a shape of a dot generated at the first and second growth points.

7. The image processing apparatus according to claim 1, wherein the controller is configured to perform the screen processing using the dither matrix for generating a dot centered on the first growth point, expanding, in accordance with increase in a pixel value of image data, the dot generated centered on the first growth point, further generating, when the pixel value exceeds a threshold value, a dot centered on the second growth point, and expanding, in accordance with increase in the pixel value, the dot generated centered on the second growth point.

8. The image processing apparatus according to claim 1, wherein each of the plurality of threshold values is a threshold value for binarizing each pixel value of the image data.

9. The image processing apparatus according to claim 1, wherein in the image after the screen processing, the first region is a region, expressed by halftone dots, that has grown from a first growth point, and the second region is a region, expressed by halftone dots, that has grown from the first growth point and a second growth point.

10. The image processing apparatus according to claim 1, wherein the plurality of thresholds of the dither matrix are arranged such that, in the image after the screen processing, the region having the first screen ruling and the first screen angle and the region having the second screen ruling and the second screen angle do not contain different frequency components.

11. An image processing method comprising:
performing screen processing on image data using a dither matrix including a plurality of threshold values, so as to generate an image after the screen processing; and
printing the image after the screen processing on a sheet,
wherein a screen represented by the dither matrix has first and second growth points each indicating a central position at which a halftone dot is generated,
wherein, in the image after the screen processing,
(i) a first region having a density lower than a predetermined density is represented by first halftone dots around the first growth point, and the plurality of thresholds of the dither matrix are arranged so that the first halftone dots have first screen rulings and first screen angles in the first region, and
(ii) a second region having a density being equal or greater than the predetermined density is represented by combining the first halftone dots around the first growth point and second halftone dots around second growth points adjacent to the first growth points, and the plurality of thresholds of the dither matrix are arranged so that combined first halftone dots and second halftone dots have screen rulings higher than the first screen rulings and second screen angles being different from the first screen angles at a predetermined angle in the second region.

12. A non-transitory computer-readable storage medium storing a computer program for causing a computer to execute an image processing method for performing screen processing on image data to be printed, the method comprising:
performing screen processing on image data using a dither matrix including a plurality of threshold values, so as to generate an image after the screen processing; and
printing the image after the screen processing on a sheet,
wherein a screen represented by the dither matrix has first and second growth points each indicating a central position at which a halftone dot is generated,
wherein, in the image after the screen processing,
(i) a first region having a density lower than a predetermined density is represented by first halftone dots around the first growth point, and the plurality of thresholds of the dither matrix are arranged so that the first halftone dots have first screen rulings and first screen angles in the first region, and
(ii) a second region having a density being equal or greater than the predetermined density is represented by combining the first halftone dots around the first growth point and second halftone dots around second growth points adjacent to the first growth points, and the plurality of thresholds of the dither matrix are arranged so that combined first halftone dots and second halftone dots have screen rulings higher than the first screen rulings and second screen angles being different from the first screen angles at a predetermined angle in the second region.

* * * * *